April 5, 1966  J. D. OWEN  3,244,880
NEUTRON AND GAMMA RAY WELL LOGGING FOR CHLORINE CONTENT
Filed Dec. 27, 1960
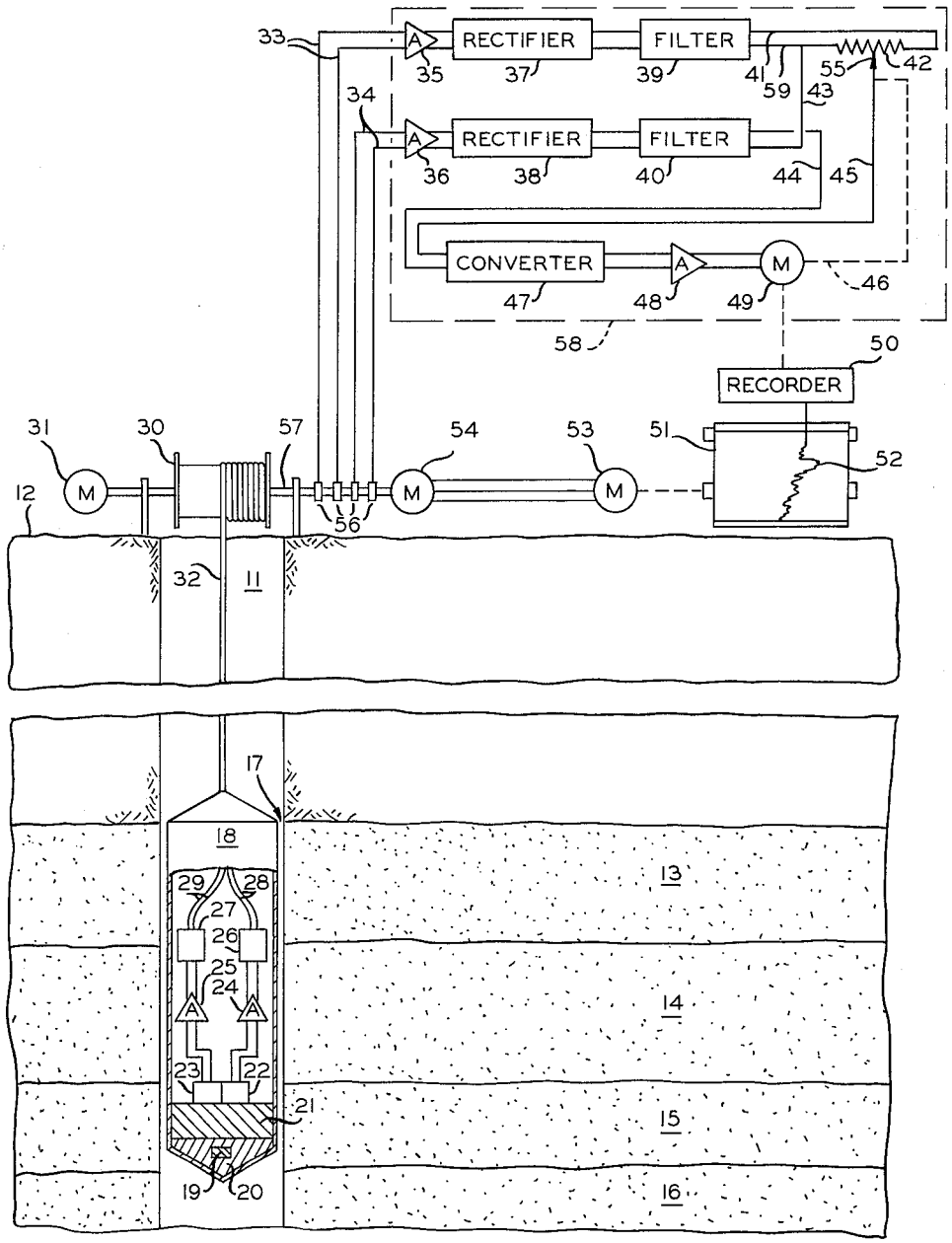
INVENTOR.
J. D. OWEN
BY Hudson & Young
ATTORNEYS United States Patent Office 3,244,880
Patented Apr. 5, 1966

3,244,880
NEUTRON AND GAMMA RAY WELL LOGGING
FOR CHLORINE CONTENT
Joe D. Owen, Bartlesville, Okla., assignor to Phillips
Petroleum Company, a corporation of Delaware
Filed Dec. 27, 1960, Ser. No. 78,693
3 Claims. (Cl. 250—83.3)

This invention relates to apparatus and method for nuclear well logging. In one aspect it relates to apparatus and a method for making a chlorine log of downhole earth formations which is independent of the formation porosity or the hydrogen log. In another aspect it relates to apparatus and a method for making a chlorine log of downhole earth formations for surveying the bore hole for indications of the presence of oil.

There has been a great deal of interest and activity in the nuclear logging field concerning the logging tool or tools that will record either gamma rays of certain energies or complete gamma ray spectra. All of these tools, in general, operate on the same principle. They have a neutron source, a neutron detector which is sensitive to either thermal or epithermal neutrons, and a gamma ray detector. The neutron detector is used to give a log which is a function of the hydrogen atom density of the rock thereby indicating the presence of porosity filled with water, oil, or water and oil. The neutron detector does not give a log which is a function of the hydrogen atom density of the rocks suitable for use in prospecting for oil when the porosity of the rocks is filled with gas. The gamma ray detectors used are frequently NaI-photomultiplier assemblies which give electrical impulses, the amplitudes of which are proportional to the gamma ray energy. Analysis of these electrical impulses is significant in interpreting the source rock type.

The gamma ray energy is related to the type of nucleus from which the gamma ray originates. Chlorine atoms are known to capture thermal neutrons with the emission of gamma rays of definite energies. At present, gamma ray logging tools in the field are operated on the principle that if both hydrogen and chlorine are present, then the likelihood of oil being present is low. The prior art chlorine log usually consists of three curves (1) a conventional gamma ray curve, (2) a conventional neutron curve and (3) a special gamma ray curve which is designated as a chlorine curve. The interpretation of these curves is based on the following reasoning. The conventional neutron curve is essentially a record of the hydrogen atom density of the rock surrounding the bore hole. Since both water and liquid hydrocarbons have about the same amount of hydrogen the neutron log does not distinguish between oil and water. It is primarily affected by porosity, assuming that the porosity is completely filled with liquid. On the other hand, the prior art chlorine curve is believed to record the relative amount of chlorine in the formation. Since chlorine is primarily contained in rock as sodium chloride dissolved in water, the prior art chlorine curve is supposed to be sensitive to the presence of water and therefore allows discrimination between oil and water sections. For this statement to be true, even qualitatively, the water must contain sodium chloride and the chlorine curve must detect the presence of chlorine in an unambiguous manner.

If hydrogen is present, but the chlorine is low, the odds are good that liquid hydrocarbons are present. The low content of chlorine is believed to indicate the low content of salt or salt water in the porosity of the rocks and with hydrogen being present, the hydrogen is believed to be present in the form of liquid hydrocarbon. The conventional chlorine curves of the prior art exhibit not only the presence of chlorine but also they include the presence of hydrogen. Thus, the problem facing the industry is to be able to obtain a chlorine curve which does not include hydrogen. A prior art chlorine curve is obtained by observing the gamma rays resulting from neutron capture in chlorine. However, the presence of hydrogen slows down the neutrons in thermal energy more rapidly than other atoms normally present in formations surrounding well bores. They can then be captured by chlorine atoms. Furthermore, the number of gamma rays seen having a specific energy [usually above 7.5 mev. (million electron volts) and within the range of about 6.2 to about 7.7 mev. from neutron capture in chlorine] is dependent upon not only the amount of chlorine present, but the thermal neutron flux as well. This statement means that the prior art chlorine curve is actually a chlorine-hydrogen curve. Thus, the greater the amount of hydrogen the higher will be the thermal neutron flux, and the greater the prior art chlorine curve even though the chlorine content might not have increased. Thus the problem becomes, how to get rid of the hydrogen effect on the chlorine curve.

An object of this invention is to provide an apparatus and a method for making a gamma ray log of downhole earth formations which is independent of the hydrogen log. Another object of this invention is to provide an apparatus and a method for making a chlorine log of downhole earth formations which is independent of hydrogen atom concentration and which indicates the presence of porosity filled with salt water. Yet another object of this invention is to provide apparatus and a method for making a chlorine log of downhole earth formations for surveying the bore hole for indications of the presence of oil. Still other objects and advantages of this invention will be realized upon reading the following description which, taken with the attached drawing, forms a part of this specification.

This invention consists in providing a nuclear logging tool which includes a gamma ray detector and a neutron detector, each of which emits signals related to the radiation or radiations which they detect. Each signal contains a thermal neutron factor and by dividing the signal emitted by the gamma ray detector by the signal emitted by the neutron detector the effect of the detected neutrons on the gamma ray detector is cancelled and a signal emitted by such a dividing device provides a trace or curve related to chlorine content of the earth formations logged and independent of the hydrogen content thereof. A single trace thus results which is independent of the hydrogen effect and is related directly to the chlorine atom content of the formations logged.

Of major importance to the interpretation of conventional chlorine logs is the porosity effect. The assumption for the discussion given hereinabove is that the chlorine log should be sensitive to the amount of chlorine present, if the competing detections are few in number. However, for neutrons to be captured by chlorine, they must first be slowed or thermalized. Such slowing down of the neutrons is a function of the amount of hydrogen present as shown by a hydrogen curve. Therefore, the prior art chlorine curve is not only sensitive to the amount of chlorine present in the region surrounding the detector, but also to the number of neutrons available to be captured. This latter statement means that there is a porosity or hydrogen effect on the chlorine curve. The chlorine curve is seen to be dependent directly on the amount of chlorine in the formation and also on the amount of hydrogen. An increase in hydrogen tends to increase the conventional chlorine curve, and an increase in chlorine obviously also tends to increase this curve.

This invention further consists of adding a thermal neutron detector, to a conventional chlorine logging tool having a gamma ray detector and positioning said thermal neutron detector in such a manner that the added detector is as close as possible to the gamma ray detector. Then, by use of appropriate count rate meters and electrical analog circuitry, I divide the output from the gamma ray detector by the output from the thermal neutron detector for removal of the thermal neutron flux term from the output from the dividing operation. By making a trace related to this quotient (output from the dividing operation) I produce a chlorine curve which is not dependent upon the thermal neutron flux and therefore is not dependent on the hydrogen content (porosity) of the formations being logged. The interpretation of a chlorine log produced in this manner greatly simplifies reading of the log and a comparison of the porosity or hydrogen content and chlorine content of various formations would be much more meaningful.

A conventional chlorine curve is equal to $K \times N$ (number of chlorine atoms per unit of volume) $\times \sigma$(nuclear cross section of chlorine in barns) $\times$ thermal neutron flux.

The $BF_3$ hydrogen or porosity curve equals $K' \times$ thermal neutron flux. Upon dividing the first of these equations by the second, there is obtained $$\text{New chlorine curve} = \frac{K \times N \times \sigma \times \text{flux}}{K' \times \text{flux}} = K'' \times N \times \sigma = CN$$

The term sigma which is the nuclear cross section of chlorine in barns is also a constant and when included with the constant $K''$ provides the constant $C$ in the final expression. This latter expression then indicates that the chlorine curve is related to a constant $\times$ the number of chlorine atoms. Thus, it is seen that the new chlorine curve obtained according to this invention is dependent only upon the number of chlorine atoms present assuming that other reactions are of minor consequence relative to the absorption of thermalized neutrons by chlorine atoms and the corresponding emission of certain gamma rays. The term "barn" is defined in Radio and Nuclear Physics, J. M. Cork (pages 87–88), second edition, 1950, D. Van Nostrand Company, Inc., New York, as a cross section of $10^{-24}$ sq. cm.

The drawing illustrates, in diagrammatic form, an arrangement of apparatus parts for achieving the objects of this invention.

In the drawing reference numeral 11 identifies a bore hole in the earth 12 penetrating formations 13, 14, 15 and 16. Disposed in this bore hole is a well logging assembly 17 which is suspended on a cable 32. This cable is attached at its upper end to a motivated reel 30 which is driven by a motor 31. Cable 32 contains at least 2 pairs of conductors 28 and 29 which terminate in slip rings 56 on drive shaft 57 of reel 30. Included with slip rings 56 are brushes which provide connections between wires 33 and 34 and the slip rings. The pairs of conductors 33 and 34 conduct electrical signals to apparatus within the broken line enclosed area 58 which enclosed apparatus can, if desired, be constructed and contained within a box. The output signal from the apparatus within broken line 58 energizes a recorder 50 for producing a trace 52 on a chart 51. Chart 51 is positioned in accordance with the depth to which housing 17 is lowered into the bore hole 11. This operation is accomplished by any suitable means, such as a generator 54 driven by shaft 57. Generator 54 energizes a motor 53 to move chart 51. The movement of chart 51 can, if desired, be provided with a suitable mechanical linkage for correlating the trace 52 with the depth in the bore hole being logged.

Positioned within a tubular case or housing 18 and at a point near its bottom is a source of neutrons 19. This source of neutrons can be a radium-beryllium capsule. Such a capsule contains the equivalent of approximately 400 millicuries of radium. The alpha radiation of radium reacts with the beryllium to release large numbers of neutrons. The neutron flux emanating from this beryllium is of the order of $6 \times 10^6$ neutrons per second, and the average neutron energy is approximately 4 million electron volts. Other sources of neutrons can be employed such as capsules containing actinium-beryllium, polonium-beryllium, or plutonium-beryllium. Maintaining the capsule or neutron source in its position is an aluminum support 20. Immediately above this aluminum support is a lead or tungsten shield 21 which is positioned between the source of neutrons and radiation detectors 22 and 23 to prevent direct passage of radiation from the source to the detectors. The neutron detector 22 is preferably an ionization type detector filled with borontrifluoride ($BF_3$). Detector 23 is a scintillation type gamma ray detector. Such a detector is described in Nucleonics, volume 16, No. 6, June 1958, page 56. The signal from the neutron detector 22 is amplified in an amplifier 24 and the signal therefrom goes to a count rate meter 26. The signal from the gamma ray detector 23 is amplified in an amplifier 25 and this amplified signal is passed on to a rate count meter 27. Rate count meters suitable for use as meters 26 and 27 are described in Catalog A–4, pages 45, 47, of Baird-Atomics, Inc., 33 University Road, Cambridge 38, Mass., copyright 1959. The pairs of conductors 28 and 29 conduct signals respectively from the count rate meters 26 and 27 through the cable 32 to the well head.

The circuit elements illustrated in the area enclosed within the broken line or box 58 are provided to measure the output or signals transmitted through the pairs of conductors 28 and 29 and to convert these signals to a signal suitable for recording by recorder 51 as trace 52 relative to the chlorine content of the formations being logged.

The end terminals of leads 33 (from the gamma ray detector 23 portion of the downhole apparatus) are connected to the input terminals of an amplifier 35. The output terminals of amplifier 35 are connected to the input terminals of a rectifier 37, the output terminals of which are connected to the input terminals of filter 39. The output terminals of filter 39 are connected by leads 41 and 59 to the end terminals of a potentiometer 42. The voltage thus applied across potentiometer 42 is of a magnitude proportional to the current flow from the gamma ray detector of the downhole apparatus.

The end terminals of leads 34 (from the neutron detector 22 portion of the downhole apparatus) are applied to the input terminals of an amplifier 36. The output terminals of amplifier 36 are connected to the input terminals of a rectifier 38 and the output terminals of this rectifier are connected to the input terminals of a filter 40. The first output terminal or filter 40 is connected to one input terminal of a converter 47. The second input terminal of converter 47 is connected to contactor 55 of a potentiometer 42. The second output terminal of filter 40 is connected by lead 43 to lead 59 which, in turn, connects the second output terminal of filter 39 with potentiometer 42. The voltage emitted from the rate count meter 26 is thus amplified, rectified and filtered. The magnitude of this voltage is applied in opposition to the voltage between the second output terminal of filter 39 and the contactor 55 of potentiometer 42. If these two voltages are equal, there is no current flow to converter 47 and servo amplifier 48. If the two voltages are unequal, there is a current flow through the input circuit of converter 47 and of polarity which is representative of the relative magnitudes and direction of the two voltages being compared. Converter 47 changes direct current flow in the input circuit thereof into a corresponding alternating current which is applied to the input terminals of amplifier 48. The output terminals of this amplifier are connected to a reversible servo motor 49. The drive shaft of motor 49 is mechanically coupled with linkage 46 to the contactor 55 of the potentiometer 42. The circuit, comprising converter 47, amplifier 48 and servo motor 49, is shown only schematically, but can be any conventional circuit known in the art which converts a voltage difference into a corresponding motor rotation.

Servo motor 49 moves contactor 55 of potentiometer 42 until the two voltages being compared are equal. The direction of rotation of motor 49 is determined by which of the two voltages being compared is of greater magnitude. A suitable circuit for this purpose is illustrated in Electronics Control Handbook, Batcher and Moulic, Caldwell-Clements Incorporated, New York, 1946, page 298. Also, an alternative circuit suitable for the purpose of this invention is described in Proceedings of the I.R.E., pages 450–451, May 1947.

As mentioned hereinabove, this invention is directed to dividing the signal related to the output from detector 23 by a signal related to the output from detector 22 in order to cancel the neutron effect and to provide means for making a trace related directly to the chlorine content of the formations being logged and independent of the hydrogen effect. Thus, by use of the apparatus enclosed within the broken line 58 or box, and utilizing this apparatus in the arithmetical manipulation as mentioned, I am able to achieve such a division. Thus, the signal emitted from the reversible motor 49 is thus related to substantially only the chlorine content of the formations being logged.

Obviously the tubular case for housing 18 is closed at both ends and is water-proof in order that electrical signals can be properly manipulated.

From the foregoing description it should be evident that there is provided in accordance with this invention a simplified well logging apparatus which is capable of sensing and recording the chlorine content of well formations being logged quite independent of the hydrogen effect. As mentioned above, this effect is achieved by dividing out the effect of thermal neutrons on the output of the gamma ray detector 23 thereby providing a chlorine log of the well independent of the effect of the neutron flux. By this operation the gamma ray detector output is essentially normalized to a constant neutron flux.

The aboveground equipment illustrated in the drawing and described hereinabove is substantially the same as the major portion of equipment illustrated in FIGURE 5 and described in U.S. Patent 2,916,691. The gamma ray detector has been mentioned above as being of the scintillation-type and consists of a crystal or crystals which produce luminescence upon being irradiated and a photomultiplier tube. Such scintillation type equipment is readily available from instrument supply houses. The neutron detector is an ionization type being filled with boron trifluoride, preferably. The outputs from the two detectors are amplified and applied to separate count rate meters which convert the count rate into a voltage. These count rate meters are illustrated herein as being parts of the logging tool and contained within housing 18, but if desired they can be mounted aboveground as a portion of a surface equipment. In this case the amplified signals from the detectors are sufficiently amplified for passage through pairs of conductors corresponding to conductors 28 and 29 for passage of signals upward to cable 32 to the surface equipment. Power sources are not shown from purposes of brevity and simplicity. The need for such and their use are well understood by those skilled in the art.

While certain embodiments of the invention have been described for illustrative purposes, the invention obviously is not limited thereto.

That which is claimed is:

1. An apparatus for producing a chlorine log of an opening in the earth comprising, in combination, a tubular member having its ends closed, said member being adapted to be lowered into an opening in the earth, a source of neutrons in said member, a borontrifluoride thermal neutron detector and a scintillation gamma ray detector suitable for detecting gamma rays of about 6.2 to 7.7 mev. only in said member, said detectors being positioned near each other, a shield between said source of neutrons and said detectors to eliminate direct passage of radiation to said detectors, said thermal neutron detector being adapted to emit a first signal indicative of the neutron flux detected, said gamma ray detector being adapted to emit a second signal related to gamma rays of 6.2 to 7.7 mev. detected and containing a thermal neutron factor, means communicating with said detectors for dividing said second signal by the first signal and being adapted to emit a third signal proportional to the quotient of said second signal by the first signal and means to plot a trace of said third signal as a trace of the chlorine content of the earth surrounding said opening.

2. An apparatus for producing only a chlorine log in the geophysical prospecting of earth formations comprising, in combination, a tubular member having its ends closed, said member being adapted to be lowered into a well bore in the earth, a source of neutrons in said member, a borontrifluoride thermal neutron detector and a scintillation gamma ray detector in said member, the detectors being positioned adjacent each other, a shield between said source of neutrons and said detectors to eliminate direct passage of radiation to said detectors, said neutron detector being adapted to emit a first signal indicative of the neutron flux detected and indicative of the hydrogen content of the formations prospected, said gamma rays detector being adapted to emit a second signal indicative of energies of 6.2 to 7.7 mev. only and characteristic of gamma rays emitted by chlorine atoms and containing a thermal neutron factor, a dividing circuit communicating with said detectors for dividing said second signal by said first signal, said dividing circuit being adapted to emit a third signal proportional to the quotient of said second signal by said first signal, and means to plot a trace of said third signal as a trace of the chlorine content of the earth surrounding said well bore and independent of the hydrogen content thereof.

3. In the apparatus of claim 2, further means communicating with said tubular member indicating the location thereof in said well bore, and said means to plot a trace being operatively actuated to plot said trace in relation to depth of said member in said well bore.

References Cited by the Examiner

UNITED STATES PATENTS

| | | | |
|---|---|---|---|
| Re. 24,383 | 10/1957 | McKay | 250—83.3 |
| 2,334,262 | 11/1943 | Hare | 250—83.6 |
| 2,345,119 | 3/1944 | Hare | 250—83.6 |
| 2,390,433 | 12/1945 | Fearon | 250—83.6 |
| 2,469,463 | 5/1949 | Russell | 250—83.6 |
| 2,776,378 | 1/1957 | Youmans | 250—83.6 |
| 2,862,106 | 11/1958 | Scherbatskoy | 250—71.5 |
| 2,933,609 | 4/1960 | Norelius | 250—83.3 |
| 2,949,535 | 8/1960 | Scherbatskoy | 250—83.6 |
| 2,971,094 | 2/1961 | Tittle | 250—83.1 |

RALPH G. NILSON, *Primary Examiner.*

ARCHIE R. BORCHELT, *Examiner.*